United States Patent
Chou et al.

(10) Patent No.: US 7,756,089 B2
(45) Date of Patent: Jul. 13, 2010

(54) FAIR RATE ALLOCATION ON AN IEEE 802.11E COMMUNICATION MEDIUM

(75) Inventors: Chun Ting Chou, Ann Arbor, MI (US); Sai Shankar Nandagopalan, Tarrytown, NY (US); Javier Del Prado Pavon, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 976 days.

(21) Appl. No.: 10/570,538

(22) PCT Filed: Aug. 23, 2004

(86) PCT No.: PCT/IB2004/051537

§ 371 (c)(1),
(2), (4) Date: Mar. 3, 2006

(87) PCT Pub. No.: WO2005/022832

PCT Pub. Date: Mar. 10, 2005

(65) Prior Publication Data

US 2007/0019591 A1    Jan. 25, 2007

Related U.S. Application Data

(60) Provisional application No. 60/499,854, filed on Sep. 3, 2003, provisional application No. 60/545,319, filed on Feb. 17, 2004.

(51) Int. Cl.
    *H04J 3/00* (2006.01)

(52) U.S. Cl. .................. 370/337; 370/447; 370/448; 370/450; 370/461; 709/223; 709/226; 709/230; 709/238

(58) Field of Classification Search .................. 370/445, 370/446, 447, 448, 449, 450, 451, 454, 461, 370/315, 319, 324; 340/825.5, 825.51, 825.52, 340/825.08, 825.41, 825.541; 709/223, 226, 709/230, 238

See application file for complete search history.

(56) References Cited

U.S. PATENT DOCUMENTS 7,136,361 B2 *  11/2006  Benveniste ............... 370/310.2

(Continued)

OTHER PUBLICATIONS

Acheiving Service Differentiation and High Utilization in IEEE 802.11 Author Vasilios A. Sirius and Matina Kavouridou, pp. 1-23, Technial Report 322- Jun. 2003.*

(Continued)

*Primary Examiner*—Pankaj Kumar
*Assistant Examiner*—Anez Ebrahim
(74) *Attorney, Agent, or Firm*—Larry Liberchuk

(57) ABSTRACT

Wireless stations (108-1-108-N) contending for exclusive access for a predetermined period of time (S232) to transmit on a communication medium (112) are regulated by a common external controller (104) using a single timing parameter (S204). Attempts at transmission access are preceded by respective delays that are expired simultaneously and at a common rate by the stations at times when the stations sense the medium to be idle (S224). The delays are pseudo-randomly selected to avoid collisions among stations in their respective access attempts (S208). Default, initial values of the respective delays (S204) applied to the stations, when multiplied by the respective expected number of transmission attempts by the stations over the long term over periods of time when no transmission attempt is unsuccessful, yield respective products equal to a constant value common to all stations (S312). The default values therefore serve as a knob by which the controller regulates air time opportunity.

20 Claims, 5 Drawing Sheets

U.S. PATENT DOCUMENTS

| | | | |
|---|---|---|---|
| 7,342,901 B1 * | 3/2008 | Zhang et al. | 370/329 |
| 7,359,972 B2 * | 4/2008 | Jorgensen | 709/226 |
| 2001/0024434 A1 | 9/2001 | Ayyagari | |

OTHER PUBLICATIONS

"Achieving Service Differentiation and High Utilization in IEEE 802.11", by Vasilios A. Siris et al., Technical Report 322, Jun. 2003, pp. 1-17.

"IEEE 802.11 EDCF: a QoS Solution for WLAN", by Javier del Prado etal.

"Trade-Off Analysis (802.11e versus 802.15.3 QoS Mechanism", Jul. 2002, pp. 1-10.

QoS Support on IEEE 802.11a (IEEE 802.11e) by Ph. Rouzet, Jan. 2002.

"QOS Signaling for Parameterized Traffic in IEEE 802.11e Wireless LANs", by Sai Shankar et al., AISA 2002, pp. 67-83.

* cited by examiner

| STATION NO. | | STA 1-2 | STA 3-4 | STA 5-6 | STA 7-8 |
|---|---|---|---|---|---|
| ASSIGNED WEIGHT | | 8 | 4 | 2 | 1 |
| I | $W_0(=CW_{min}+1)$ | 32 | 64 | 128 | 256 |
| | $CW_{max}$ | 1023 | 1023 | 1023 | 1023 |
| | ACTUAL SHARE | 8.9401 | 4.1556 | 2.0140 | 1.0000 |

| STATION NO. | | STA 1-4 | STA 5-8 | STA 9-12 | STA 13-16 |
|---|---|---|---|---|---|
| II | $W_0(=CW_{min}+1)$ | 32 | 64 | 128 | 256 |
| | $CW_{max}$ | 1023 | 1023 | 1023 | 1023 |
| | ACTUAL SHARE | 8.4828 | 4.0041 | 1.9723 | 1.0000 |

FIG. 5

FAIR RATE ALLOCATION ON AN IEEE 802.11E COMMUNICATION MEDIUM

CROSS REFERENCE TO RELATED APPLICATION

This application claims the benefit of U.S. provisional application Ser. No. 60/499,854 filed Sep. 3, 2003 and U.S. provisional application Ser. No. 60/545,319 both of which are incorporated herein in whole by reference.

The present invention relates to fair channel access allocation among contending stations on a common communication medium. More particularly, the present invention relates to fair regulation of the access using a single tuning parameter.

Stations in a wireless local area network (LAN) have different transmission rates, depending on their location, which complicates regulation of transmission access by the stations to a common communication medium.

Fair scheduling of data transmission in wired networks has long been studied extensively as a means of resource allocation to contending traffic. In general, the objective of fair scheduling is to allocate contending traffic flows the system resource proportional to their share. With this basic functionality, fair scheduling can be used for many different purposes. On the one hand, it can prevent greedy or misbehaving users from starving the other users, and thus, achieve fairness among the users. On the other hand, it can allocate more resources to preferred users to achieve service differentiation. Fair scheduling is primarily based on Generalized Processor Sharing, and numerous scheduling algorithms have been proposed to approximate its performance. These scheduling algorithms, originally designed for wired networks, are adapted to deal with the rapid growth of wireless communication services and applications. However, there are several new challenges unseen in wired networks whose resolution would enhance the fairness in wireless/mobile networks.

An IEEE (Institute of Electrical and Electronics Engineers) 802.11 wireless LAN provides an example of how implementing fairness becomes problematic. As shown in FIG. 1, the 802.11 LAN 100 can operate in two modes, namely the infrastructure and ad hoc modes. In the infrastructure mode, a station can only send/receive frames to/from the controlling station or access point (AP) 104. The AP 104 can be regarded as a "super station" because it is the only station that can send/receive frames from all other stations 108-1 to 108-N in the wireless LAN 100. This functionality has been enhanced in IEEE 802.11e (new standard for quality of service in WLAN) by allowing stations to communicate directly to other neighbors in the quality-of-service (QoS) basic service set (QBSS) which comprises a number of wireless QoS stations (QSTAs) that execute the same Medium Access Control (MAC) protocol and compete for access to the same shared medium. A station may have several concurrent traffic flows to schedule for transmission and may also contend with other stations for access to the shared radio/channel in the wireless medium 112.

The fairness provisioning can, conceptually, be divided into two stages in such a network: per-flow fairness, where the scheduler at each station schedules its local traffic flows 116-1 to 116-N to ensure fairness between them; and per-station fairness, where all stations 108-1 to 108-N in the entire network have to be controlled such that the radio resource can be shared fairly.

Both types of fairness, per-flow and per-station must be maintained to afford fair provisioning system-wide. Even though a wireless station can schedule as a wired node does, to achieve per-flow fairness, the absence of coordination among stations makes per-station fairness problematic. The usual solution puts the AP in charge of scheduling the frame transmissions from/to all stations. Since the AP does not have information about traffic flows of individual stations, these stations need to provide their queue/traffic status information to the AP so that the scheduler at the AP can function properly. For example, the scheduler at least needs to know if a station has packets to send; most fair scheduling algorithms require more detailed information than this, such as the arrival time of individual packets, for correct computation of transmission order. However, the delay in relaying this status information could make the information obsolete when it is to be used by the AP scheduler. More frequent transmission of this information could alleviate the problem but it will incur substantial control overhead. Thus, a better and more robust way to achieve per-station fairness is to use a distributed scheduling algorithm, instead of relying on the AP scheduler.

Many existing wireless networks support more than one physical transmission rate. An 802.11 wireless LAN can support 11, 5.5, 2 and 1 megabit per second (Mbps), while an 802.11a wireless LAN can support up to 8 different rates. Depending on the channel condition, especially their distance from the AP, wireless stations may choose different transmission rates in order to increase the probability of successful transmission. As shown in FIG. 1, for example, station 108-N may choose 1 Mbps to transmit/receive data frames to/from the AP while station 108-1 chooses 11 Mbps. It is tricky to define a fair share of resources among the stations in such a network, because using different transmission rates to serve different stations with an equal amount of traffic requires allocation of different amounts of air time to the stations. Thus, a fair share of system throughput is no longer synonymous with a fair share of air time in a system that supports multiple transmission rates. No such location-dependent transmission rates exist in wired networks, and hence, applying the existing scheduling algorithms (designed for wired networks) without considering this property may result in a station's misuse of radio resource.

Another well-known property in wireless networks is the high probability of transmission errors and its intrinsic location-dependency. Each wireless station, due to multi-path fading and electromagnetic interference, may experience different probabilities of transmission errors. Unlike location-dependent transmission rates which affect per-station fairness, location-dependent errors mainly affect per-flow fairness among traffic flows within a station. For example, flow 116-1 of station 104 in FIG. 1 may suffer from high levels of transmission error while flow 116-2 is error-free. A typical solution is to compensate the flow that has experienced the error with extra air time at a time when the channel condition has cleared. However, flows with higher error rates use more air time to compensate for their loss of throughput caused by transmission errors. This overuse of radio resource by the error-prone flows, in turn, reduces the total system throughput. In an IEEE 802.11 wireless LAN, each frame will be retransmitted up to retry limit (=7) times in case of transmission failure. This medium access control (MAC)-layer retransmission mechanism indirectly compensates error-prone flows as the above scheduler does, thus overusing the radio resource. Therefore, a scheduling algorithm to be used in wireless networks must also be able to address the unfairness caused by the MAC-layer retransmission mechanism.

The present invention has been made to address the above-noted shortcomings in the prior art. It is an object of the invention to implement per-station and per-flow fairness system-wide on a network having stations that are able to successfully transmit on a communication medium not more than one at a time and that expire, simultaneously and at a common rate, respective actual delays applied before re-attempting to transmit on the medium.

In brief, a single parameter is used to regulate the number of attempts to gain exclusive transmission-access to the medium for a predefined period. The regulation is operative for any given one or more of the stations, and is accomplished by specifying as values of the parameter respective default quantities based upon which values corresponding ones of the delays are selected. The values are updated responsive to outcomes of respective ones of the attempts. The products of the default quantities and expected rates of respective ones of the attempts respectively approach a predefined constant over the long term, for periods when none of said attempts is unsuccessful and during which the stations are continuously backlogged.

Details of the invention disclosed herein shall be described with the aid of the figures listed below, wherein:

FIG. 5 is a pairs of tables of simulation results in accordance with the present invention.

Figure 1:
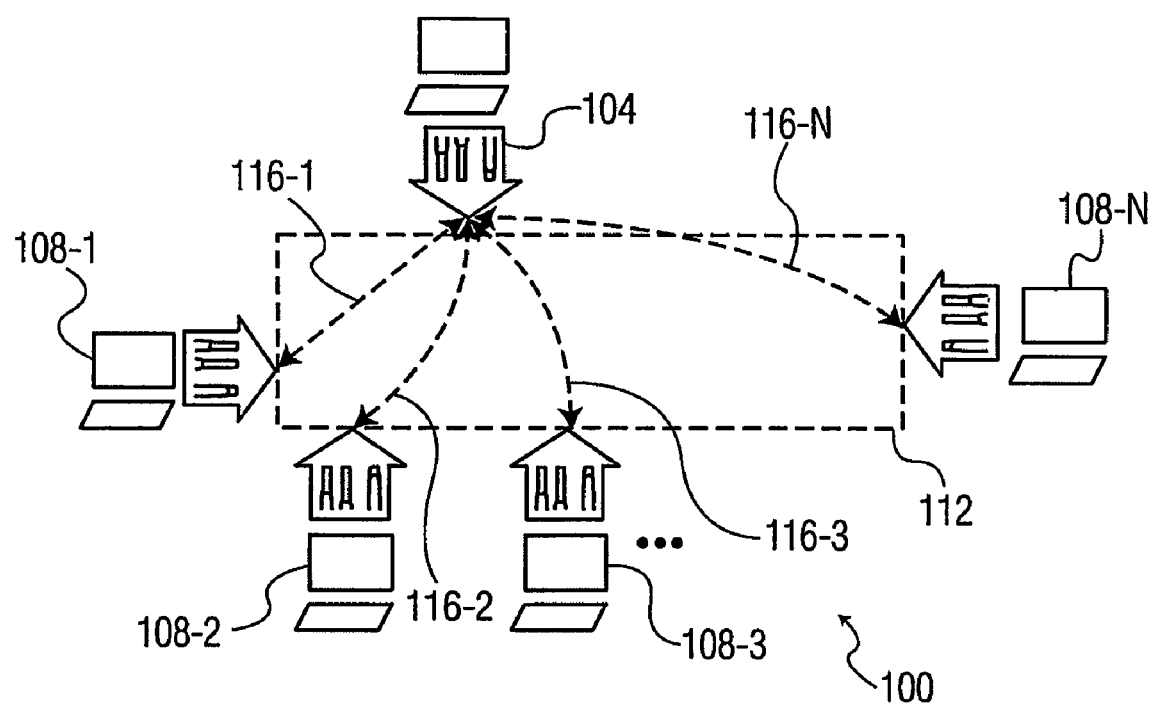
FIG. 1 is a flow diagram depicting a generic wireless/mobile network.

In accordance with the present invention, and by way of illustrative and non-limitative example, per-flow and per-station fairness is applied to a wireless LAN 100 such as that shown in FIG. 1 and, in particular, operating under IEEE 802.11e. This standard features quality-of-service (QoS) guarantees to packets at the QoS station (QSTA) based of four different user priority (UP) classes. Thus, for example, 911 calls might utilize a higher priority class than a typical short messaging service (SMS) message from a phone. The QSTAs and the QoS controller or AP (QAP) make up a QoS facility which has a hybrid coordination function (HCF). (This HCF is the new coordination function that is defined in the upcoming IEEE 802.11e draft standard for QoS). The latter has two modes of operation, a contention based channel access function known as EDCA (enhanced distributed channel access) and a channel access function based on polling known as HCCA (HCF controlled channel access). The principles of the present invention are suitably applied to EDCA which deals with prioritized traffic and will be described below in connection with the infrastructure mode, i.e., QSTA to QAP communication and vice versa.

Under EDCA, the QSTAs are able to successfully transmit on the wireless medium not more than one at a time. To avoid collisions between concurrent attempted transmissions of different stations which results in respective unsuccessful transmission attempts, the QSTAs operate under the carrier sense multiple access with collision avoidance (CMSA/CA) protocol. Each QSTA 108-1 to 108-N senses whether the medium 112, e.g. transmitting channel, is busy or idle, and defers transmission if the medium is detected to be busy. Collisions, nevertheless, cannot be completely eliminated due to the delayed perception by each QSTA of another QSTA's activity. The QSTAs contend for a transmission opportunity (TXOP), which is a bounded interval during which the QSTA may transmit traffic in the form of a series of frames or medium access control (MAC) service data units (MSDUs). During a TXOP or up until the time at which the failure of an attempted transmission due to collision or other factors is made known, as by expiry of an acknowledgment (ACK) timer, any QSTA will sense the medium to be busy and therefore will not attempt to transmit To avoid collisions, the QSTA just having undergone the TXOP or collision must wait for two consecutive different time periods before re-attempting to transmit The first time period is known as an arbitrary inter-frame space (AIFS). This is a time interval for which each QSTA must perceive the medium to be idle before attempting to transmit. The second time interval is called a backoff interval. The backoff interval consists of a series of identical time slots of duration aSlotTime, the interval expiring by decrementing slot by slot during periods in which the channel is sensed to be clear. The backoff interval is pseudo-randomly selected, i.e. with a pseudo-random number of slots, so that the probability of two or more QSTAs attempting to transmit simultaneously is small. The interval over which the pseudo-random selection is made has as its lower limit 0 with an upper limit of CW*aSlotTime, where CW stands for contention window. To decrease the incidence of collisions, the number of slots of CW is incremented for a QSTA after its collision according to the formula CW:=2(CW+1)−1 each time subject to maximum value of $CW_{max}$, and subject to the MAC retry limit attainment of which eliminates the packet. On the other hand, any successful attempt to gain exclusive transmission-access for a predefined period of time, i.e., any successful TXOP, resets CW for the QSTA to its default quantity $CW_{min}$. Although incrementing CW avoids re-occurrence of collision, it also reduces the number or frequency of attempts by the QSTA to gain a TXOP. In fact, EDCA provides that each of the $CW_{min}$, $CW_{max}$, AIFS and TXOP varies by UP class. Higher values of the first three parameters decrease the number of attempts to gain exclusive transmission access (hereinafter "ETAAs"), whereas a higher value of the latter parameter has no effect on ETAA but affords more transmission time. Due to their functional relationship to UP, the parameters will at times hereinafter will be denoted $CW_{min}[UP]$, $CW_{max}[UP]$, AIFS[UP] and TXOP[UP], respectively. These access parameters are provided in a periodically (e.g., 50 milliseconds) broadcasted beacon signal from the AP 104 to the other stations 116-1 to 116-N, and may be updated in any particular broadcast.

The variance of the access parameters by UP is a new feature in IEEE 802.11e not found in the original IEEE 802.11 standard. Under 802.11, each wireless station (WSTA or STA) would transmit over a set interval of time and ACK timers would expire over a set interval of time, neither interval varying by priority class, a concept which did not exist in 802.11. In addition, the 802.11 destination interframe spacing (DIFS) which corresponds to the 802.11e AIFS is constant As a consequence of the above, the STAs expire the backoff delays before re-attempting transmission simultaneously and at a common rate. That is, at the end of a STA's transmission or when a collision or other type of failed transmission attempt is made known, and after the DIFS interval, each STA expires slot by slot its respective backoff in synchrony, a subsequent transmission attempt being undertaken when a STA runs out of backoff slots. Again, upon that subsequent attempt, expiry of the backoffs is deferred until the medium is once again idle for the period DIFS.

The lock-step expiry of backoffs under IEEE 802.11 equalizes among STAs the average backoff between collisions when viewed over a long period of time. The reasoning is as follows. First, when considering for simplicity a network of only two STAs, each of the backoffs in between collisions is pseudo-randomly selected from the interval $[0-CW_{min}]$

*aSlotTime, except for the backoffs immediately following the first collision. Even those backoffs immediately following the first collision are selected from the same interval. Therefore, the expected mean or average value of the backoffs for each of the two STAs is equal, and approximately equal to aSlotTime*$CW_{min}$/2 although somewhat higher when accounting for the immediately following backoffs. As, however, the time between collisions increases, the expected mean approaches aSlotTime*$CW_{min}$/2 of the STAs. A long time period can be assumed due to the infrequency of collisions in a system with random backoff. When considering more than two STAs, not all STAs are involved in a collision and the likelihood of some collision at any particular time increases; yet the fact that a successful transmission resets CW suggest that expected mean still approaches aSlotTime*$CW_{min}$/2 for N STAs over the long term. Since the backoff intervals of respective STAs expire in synchrony, over the same length of time assuming the STAs are continuously backlogged, and since the mean lengths of the backoff intervals are equal, the number of backoff intervals for each STA is identical. Moreover, since the number of backoffs is equal to the number of ETAAs, the number of ETAAs for each STA is identical. Each STA, as a consequence, is accorded its fair share of air time. The possibility that a STA might not be continuously backlogged does not detract from this fairness, because that STA cannot complain about missing a transmission opportunity at a time when the STA has no traffic to transmit. That is, each STA gets the same number of opportunities to gain exclusive transmission access for a period of time that is invariant among STAs. The wasting of an opportunity by some STAs due to collision or error, or the ability/inability of some stations to capitalize on the opportunity due to high/low transmission rates, does not impinge on the per-station fairness of potentially equal air time accorded to all.

This all changes with IEEE 802.11e, because the variance of access parameters with priority breaks the lock-step expiry of backoffs. In particular, AIFS[UP] varies with QoS priority class UP, so that classes with shorter AIFS[UP] delays begin expiry of backoff slots before other classes thereby destroying lock-step expiry of backoffs.

In accordance with the present invention, lock-step expiry of backoff intervals is restored by using the single timing parameter $CW_{min}$[UP] as a "knob" by which to regulate transmission access with precision and in a manner that affords a fair share opportunity to transmission access based on user priority UP.

Due to lock-step expiry in accordance with the present invention, and again considering for simplicity a network having two stations, and as a further simplification that the stations having different respective UPs, the mean backoff between collisions for station 1 is aSlotTime*$CW_{min}$[UP1] and aSlotTime*$CW_{min}$[UP2] for station 2. This excludes again the effect of the first collision, an effect that is minimized as the time between collisions is increased. Since backoffs expire in synchrony:

$$E[n_1]:E[n_2] \approx (1/CW_{min}[UP_1]):(1/CW_{min}[UP_2])$$

where $n_1$ is the number of backoff intervals for station 1 between the collisions, $n_2$ is the number of backoff intervals for station 2 between the collisions, $E[n_1]$ and $E[n_2]$ are the respective means or expected values of $n_1$ and $n_2$, ":" denotes the ratio between two quantities, and "≈" means "approximately equal to."

Strict equality is approached over the long term, even for the case of multiple QSTAs of different UPs, as set forth above. Stated another way, for any station i, the product $E[n_i]$*$CW_{min}$[$UP_i$] approaches a predefined constant over the long term while the QSTAs are continuously backlogged, the constant being invariant with i.

In effect, the number of attempts at exclusive transmission-access (ETAAs) is inversely proportional to $CW_{min}$[UP]. Herein lies the key to fair share regulation of transmission access. By contrast, using AIFS[UP] under IEEE 802.11e to regulate by reducing the delay for higher priority packets may result in more transmission opportunities and/or more air time, but it is not clear how much more, if any, except perhaps through empirical observation. AIFS[UP] is thus not a precise knob like the single time parameter $CW_{min}$[UP] of the present invention, and therefore cannot be utilized with the precision and ease with which $CW_{min}$[UP] is employed to afford a fair share of air time opportunity in accordance with the present invention.

Although the above analysis assumes that each QSTA handles traffic of one UP, the analysis holds, even when a UP is distributed across QSTAs, during time periods in which each QSTA continues to handle the same respective UP. That is, during long-term periods in which each STA continues to handle the same respective UP, during which none of said attempts is unsuccessful and during which the stations are continuously backlogged, the product $E[n_i]$*$CW_{min}$[$UP_i$] approaches a predefined constant. It is within the intended scope of the invention to utilize $CW_{min}$[UP] as an efficient, precise transmission opportunity knob even when a UP is distributed across QSTAs.

Figure 2:
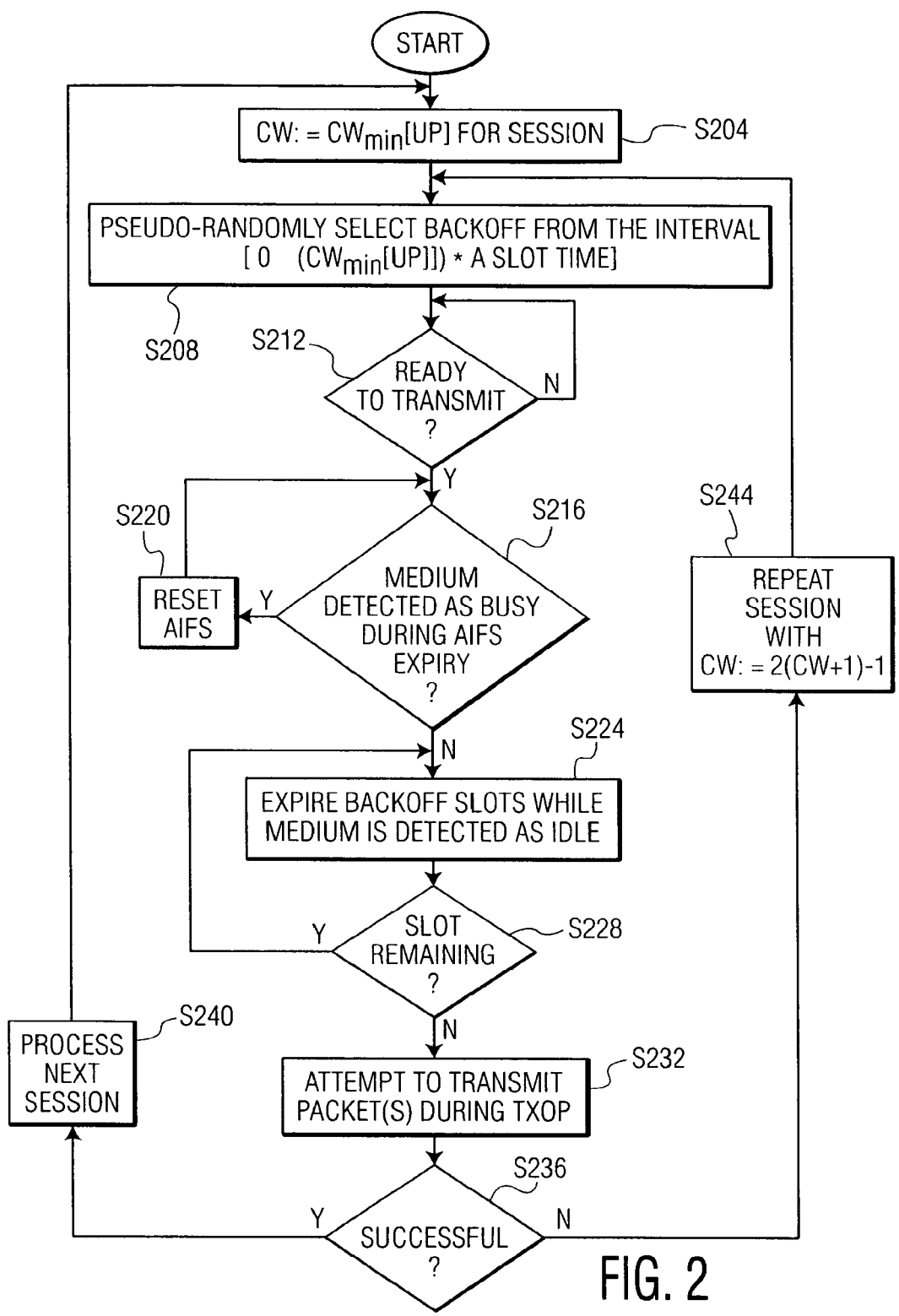
FIG. 2 is a flow chart illustrating an example of a process executable at a station in accordance with the present invention.

FIG. 2 illustrates an example of traffic transmission at a QSTA according to the present invention. The traffic to be transmitted by a QSTA is divided into sessions, each comprising a traffic flow such as a packet or MSDU, or an aggregation of traffic flows. A session may also comprise, for example, all of the traffic transmitted by a respective QSTA. Each session is accorded a UP, and, with the CW for a session set initially at $CW_{min}$[UP] (step S204), the backoff interval is selected (step S208). When the QSTA is ready to transmit (step S212), which will always be the case while the QSTA is continuously backlogged with traffic, the QSTA senses under the CSMA/CA protocol if the wireless medium is idle. If the medium is sensed to be idle for less than the AIFS, the AIFS is reset (steps S216, S220); otherwise, expiry of the backoff interval begins (step S224). Notably and in contrast to IEEE 802.11e, the AIFS is invariant with UP, so that backoff expiry is in lock-step, thereby rendering $CW_{min}$[UP] a precise knob by which to regulate fair access to transmission air time. If in step S212, a QSTA is not ready, i.e., is not backlogged, another QSTA in the lock-step scheme will attempt access, which causes the medium to be sensed as busy. Therefore, the QSTA missing out on an access attempt re-synchronizes with the other QSTAs at a future time when the QSTA is again backlogged. When the last slot expires (S228), the QSTA attempts to transmit the one or more packets that comprise the session during a TXOP (S232). If the QSTA determines, as by receipt of an ACK, that the transmission has been successful (step S236), the next session is processed (step S240). Otherwise, if the QSTA determines that the transmission was unsuccessful, as by expiry of an ACK timer, a transmission attempt for that session is repeated by incrementing the CW and selecting a backoff based on the new CW (S244). Regardless of the respective transmission rates of the various QSTAs 108-1 to 108-N, each of the QSTAs affords its sessions the opportunity for transmission during an air time that varies only with the priority of the session, i.e., a fair share of air time.

Figure 3:
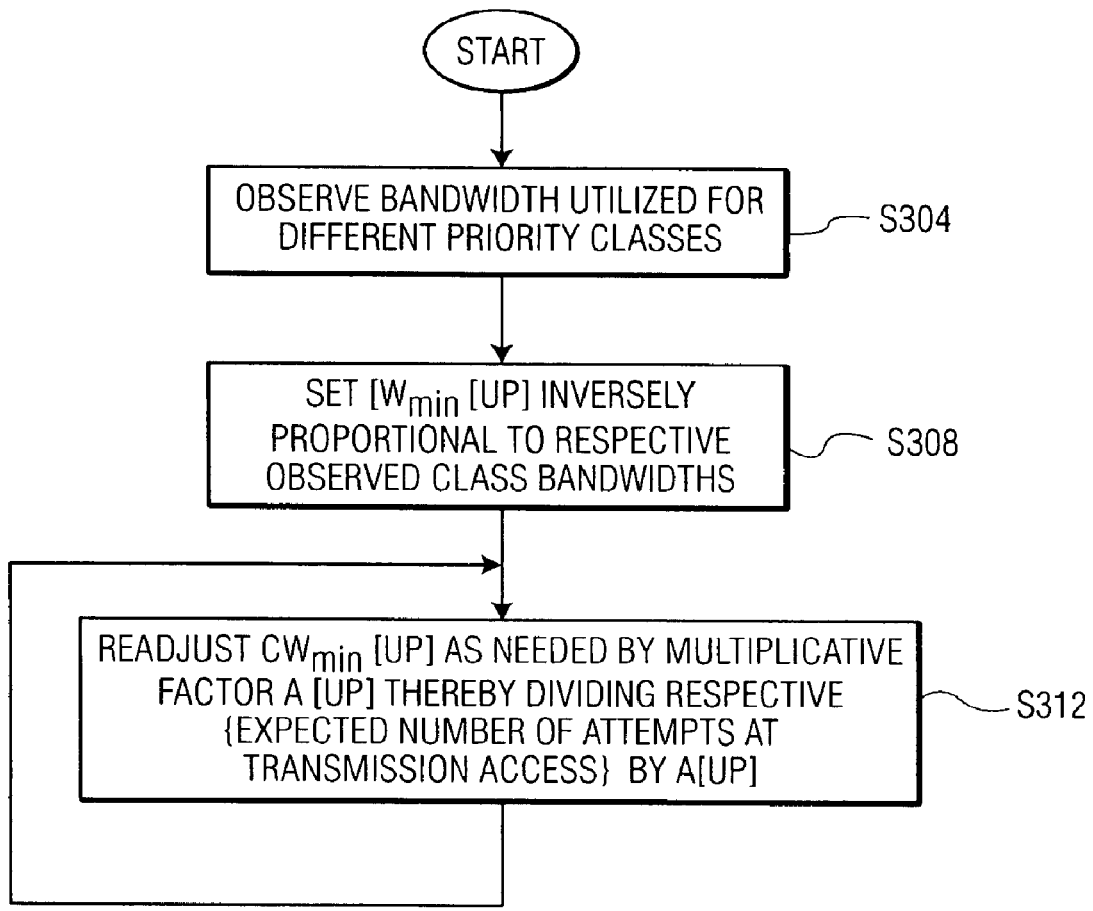
FIG. 3 is a flow chart illustrating an example of a process pertaining to a station controller in accordance with the present invention.

FIG. 3 illustrates an example of a method of allocating transmission air time to QSTAs of equal transmission rate, in which, according to the present invention, $CW_{min}[UP]$ is used as a precise bandwidth allocation knob. First, observation is made of the bandwidth utilized by the different UPs (step 304). This may be done, for example, under ideal or desired channel conditions. Then, $CW_{min}[UP]$ is set inversely proportional to respective observed class bandwidths (S308). These first two steps may be carried out a priori in configuring a network. Any adjustments to bandwidth, after network operation has begun, are accomplished by the AP 104 by means of the precise $CW_{min}[UP]$ bandwidth allocation knob (S312). Bandwidth is not guaranteed. Instead, the goal is to guarantee the opportunity to a fair share of air time, a fair share being determined by priority and being resilient against error-prone QSTAs that might otherwise degrade overall system performance if per-station fairness were to be based merely on successful transmissions.

Figure 4:
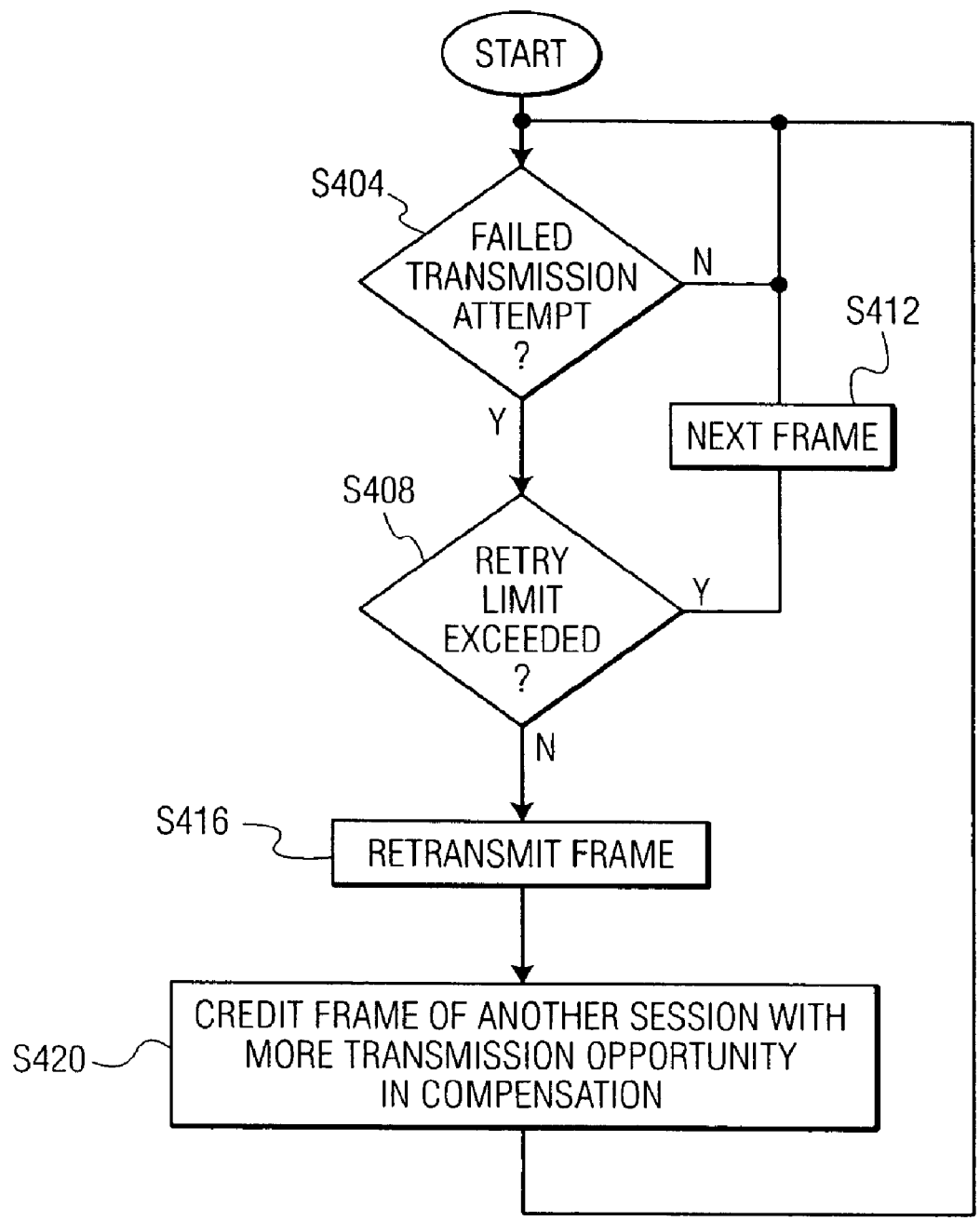
FIG. 4 is a flow chart illustrating an example of another process executable a station controller in accordance with the present invention.

FIG. 4 is a flow chart demonstrating, by example, a method for implementing the second stage in fair allocation, per-flow fairness, in accordance with the present invention. For a failed transmission attempt by the AP (step S404), if the retry limit is thereby exceed (step S408), the next frame is processed (step S412). Otherwise, if the retry limit is not exceeded, the frame is retransmitted (step S416). The session to which the frame belongs will therefore consume more of the AP's transmission time by virtue of the retransmission attempt. In compensation and in keeping with per-flow fairness, another session is credited with more transmission opportunity (step S420). The additional transmission opportunity may be in the form of an extended TXOP as a result of which the session may be augmented wit h an additional frame.

Since the main concern is with per-flow inequities that are location-dependent, and since the AP 104 is the only IEEE 802.11e QSTA whose flows are to different destinations in the infrastructure mode, the local scheduler function set forth above for per-flow fairness may be situated merely in the AP 104. This is an efficiency realized in addition to those resulting from distributed per-station regulation.

FIG. 5 shows two tables of simulation results in accordance with the present invention. The simulations assumed IEEE 802.11 STAs operating in the DCF mode which is analogous to the current EDCA mode of 802.11e. The infrastructure mode was also assumed. In addition, the choice of transmission rates 11, 5.5, 2 and 1 Mbps was adopted, as well as a retry limit of 7. Each station is assumed to be continuously backlogged and each station can transmit only frame at each transmission opportunity. Moreover, the stations were assumed to have equal transmission rates. By virtue of regulation by the single timing parameter $CW_{min}[UP]$, whose values are set in inverse proportion to the priority or assigned weight of the traffic to be transmitted from a station, it is observed in Table 1 that each station's actual share of the transmission opportunities tracks the assigned priority. The $CW_{min}[UP]$ knob exhibits greater fidelity in Table 2 where each of the four UPs is applied to four stations rather than two stations.

While there have been shown and described what are considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for regulating transmission of traffic on a communication medium, said method comprising:

providing a plurality of stations able to successfully transmit on the communication medium not more than one at a time, the plural stations expiring simultaneously and at a common rate respective actual delays applied before re-attempting to transmit on said communication medium; and using a single timing parameter, by specifying as said timing parameter's values respective default quantities based upon which values corresponding ones of said delays are selected, to regulate, for any given one or more of the plural stations, the number of attempts to gain exclusive transmission-access to the communication medium for a predefined period, the values being updated responsive to outcomes of respective ones of said attempts, the products of said default quantities and expected rates of respective ones of said attempts, for long-term periods when none of said attempts is unsuccessful and during which the stations are continuously backlogged, respectively approaching a predefined constant.

2. The method of claim 1, wherein said default quantities represent respective upper limits on ranges from which said corresponding ones of said delays are selected.

3. The method of claim 1, wherein the updating increments said values being updated upon respective unsuccessful ones of said attempts and resets said values being updated to their corresponding default values upon respective successful ones of said attempts.

4. The method of claim 1, wherein the stations are configured to wirelessly transmit the traffic by means of the communication medium.

5. The method of claim 1, wherein said default values are the same for respective ones of said attempts at the same quality-of-service (QoS) priority regardless of respective rates of transmission.

6. The method of claim 1, wherein the portion of the traffic transmitted by any of the plural stations is divided into sessions of respective priority, said expected rates and said default quantities varying by priority according to the respective priorities.

7. The method of claim 1, wherein a portion of the traffic is transmitted to the stations by a controller, said portion being divided into sessions, the session being divided into frames, the controller according, based on an unsuccessful attempt at transmission for a frame of the frames, extra transmission opportunity to a frame of another session.

8. The method of claim 1, wherein said specifying as its values involves observing bandwidth actually utilized by different priority classes of the traffic and setting respective ones of the default values in inverse proportion to the observed bandwidths, and further involves an adjustment of said timing parameter, to meet any given, targeted, proportional increase or decrease in respective ones of said expected rates.

9. The method of claim 1, wherein said stations sense that the communication medium is idle for a predetermined period before applying said respective actual delays, said predetermined period not varying by quality-of-service (QoS) priority, said expected rates and said default quantities varying by said priority.

10. A system for regulating transmission of traffic on a communication medium, said system comprising:

a plurality of stations able to successfully transmit on the communication medium not more than one at a time, the plural stations being configured to expire simultaneously and at a common rate respective actual delays applied before re-attempting to transmit on said communication medium; and a controller configured to use a single timing parameter, by specifying as said timing parameter's values respective default quantities based upon which values corresponding ones of said delays are selected, to regulate, for any given one or more of the plural stations, the number of attempts to gain exclusive transmission-access to the communication medium for a predefined period, the values being updated responsive to outcomes of respective ones of said attempts, the products of said default quantities and expected rates of respective ones of said attempts, for long-term periods when none of said attempts is unsuccessful and during which the stations are continuously backlogged, respectively approaching a predefined constant.

11. The system of claim 10, wherein said default quantities represent respective upper limits on ranges from which said corresponding ones of said delays are selected.

12. The system of claim 10, wherein the updating increments said values being updated upon respective unsuccessful ones of said attempts and resets said values being updated to their corresponding default values upon respective successful ones of said attempts.

13. The system of claim 10, wherein said controller comprises an access point, the stations being configured to wirelessly transmit the traffic by means of the communication medium.

14. The system of claim 10, wherein said default values are the same for respective ones of said attempts at the same quality-of-service (QoS) priority regardless of respective rates of transmission.

15. The system of claim 10, wherein the portion of the traffic transmitted by any of the plural stations is divided into sessions of respective priority, said expected rates and said default quantities varying by priority according to the respective priorities.

16. The system of claim 10, wherein a portion of the traffic is transmitted to the stations by said controller, said portion being divided into sessions, the session being divided into frames, the controller according, based on an unsuccessful attempt at transmission for a frame of the frames, extra transmission opportunity to a frame of another session.

17. The system of claim 10, wherein said specifying as its values involves observing bandwidth actually utilized by different priority classes of the traffic and setting respective ones of the default values in inverse proportion to the observed bandwidths, and further involves an adjustment of said timing parameter, to meet any given, targeted, proportional increase or decrease in respective ones of said expected rates.

18. The system of claim 10, wherein said stations sense that the communication medium is idle for a predetermined period before applying said respective actual delays, said predetermined period not varying by quality-of-service (QoS) priority, said expected rates and said default quantities varying by said priority.

19. A communication program stored in non-transitory computer readable medium to cause a computer regulating transmission on a communication medium to execute the steps of:
 communicating with a plurality of stations able to successfully transmit on the communication medium not more than one at a time, the plural stations expiring simultaneously and at a common rate respective actual delays applied before re-attempting to transmit on the communication medium; and
 using a single timing parameter, by specifying as said timing parameter's values respective default quantities based upon which values corresponding ones of said delays are selected, to regulate, for any given one or more of the plural stations, the number of attempts to gain exclusive transmission-access to the communication medium for a predefined period, the values being updated responsive to outcomes of respective ones of said attempts, the products of said default quantities and expected rates of respective ones of said attempts, for long-term periods when none of said attempts is unsuccessful and during which the stations are continuously backlogged, respectively approaching a predefined constant.

20. An integrated circuit comprising the program and computer-readable medium of claim 19.

* * * * *